(12) United States Patent
Reddy et al.

(10) Patent No.: US 8,504,528 B2
(45) Date of Patent: Aug. 6, 2013

(54) DUPLICATE BACKUP DATA IDENTIFICATION AND CONSOLIDATION

(75) Inventors: Chandra Reddy, South Setauket, NY (US); Ming Yan, Beijing (CN); Liqiu Song, Beijing (CN)

(73) Assignee: CA, Inc., Islandia, NY (US)

( * ) Notice: Subject to any disclaimer, the term of this patent is extended or adjusted under 35 U.S.C. 154(b) by 325 days.

(21) Appl. No.: 12/614,765

(22) Filed: Nov. 9, 2009

(65) Prior Publication Data

US 2011/0113013 A1 May 12, 2011

(51) Int. Cl.
*G06F 7/00* (2006.01)
*G06F 17/00* (2006.01)
*G06F 17/30* (2006.01)

(52) U.S. Cl.
USPC ............ 707/664; 707/653; 707/654; 707/667

(58) Field of Classification Search
USPC ........................................................... 435/2
See application file for complete search history.

(56) References Cited

U.S. PATENT DOCUMENTS

| | | | |
|---|---|---|---|
| 6,516,320 B1* | 2/2003 | Odom et al. | 707/747 |
| 7,620,630 B2* | 11/2009 | Lloyd et al. | 1/1 |
| 7,761,425 B1* | 7/2010 | Erickson et al. | 707/649 |
| 7,870,103 B1* | 1/2011 | Maheshwari et al. | 707/687 |
| 2009/0226880 A1* | 9/2009 | Anderson et al. | 435/2 |
| 2009/0228484 A1* | 9/2009 | Reddy et al. | 707/6 |

* cited by examiner

*Primary Examiner* — Susan Chen
(74) *Attorney, Agent, or Firm* — Schwegman Lundberg & Woessner, P.A.

(57) ABSTRACT

The various embodiments herein include operate to identify, consolidate, and reduce redundant backup data storage. One embodiment includes storing data blocks and first signatures of data chunks of each stored data block, the first signature of each data chunk including a reference to a storage location of the data chunk within a stored data block, the stored data blocks including data blocks of previous and recent backup sessions. Some embodiments further include storing second signatures in a second signature repository, where the second signatures are calculated based on determined boundaries of the first signatures from previous backup sessions. At least one of the second signatures is calculated based on at least two first signatures, and in the range of 32 to 64 first signatures in some embodiments. Some embodiments may identify data chunks of the recent backup session present in the stored data blocks prior to the recent backup session.

20 Claims, 8 Drawing Sheets

DUPLICATE BACKUP DATA IDENTIFICATION AND CONSOLIDATION

BACKGROUND INFORMATION

Data is very important to individuals and businesses. Many businesses regularly backup data stored on computer systems to avoid loss of data should a storage device or system fail or become damaged. One current data backup trend is to backup data to disks and use tapes for long-term retention only. The amount of disk space needed to store a month's backup can be very large, such as around 70 terabytes per server in a multi-server computing environment in some examples. The amount of data will likely only be increasing going forward.

One strategy for backing up data is performed as backup data is copied from a storage device and involves backing up only data that has changed, as opposed to all of the data, and then using prior backups of unchanged data to reconstruct the backed-up data if needed. In one approach, data may be divided into fixed size chunks. An MD5 hash or a SHA256 hash may be calculated on the data belonging to the fixed size chunks of data based on logical or natural boundaries of the data, resulting in an MD5 signature for each block of data. The MD5 signature may be searched against an in memory database or an embedded database of previous MD5 signatures. The next time the data is backed-up, signatures are generated for the chunks and searched against the database of signatures to find duplicates if any data has changed. However, this strategy is performed with regard to only a single volume of a single computing device as data is backed-up which increases the time for taking a backup.

SUMMARY

The various embodiments herein include at least one of systems, methods, and software that operate to identify, consolidate, and reduce redundant backup data storage. One such embodiment is a method that includes storing blocks of data and first signatures of data chunks of each stored data block, the first signature of each data chunk including a reference to a storage location of the data chunk within a stored data block, the stored data blocks including data blocks of previous and recent backup sessions. This method further includes storing second signatures in a second signature repository, where the second signatures are calculated based on determined boundaries of the first signatures from previous backup sessions. At least one of the second signatures is a signature calculated based on at least two first signatures. The method additionally includes identifying data chunks of the recent backup session present in the stored data blocks prior to the recent backup session.

In some embodiments of the method, the identifying of data chunks of the recent backup session present in the stored data blocks prior to the recent backup session includes calculating current second signatures based on determined boundaries of current first signatures of the recent backup session and performing a search of the second signature repository for the current second signatures to identify second signature matches. When a second signature match is not found, the method includes adding the current second signature to the second signature repository. When a second signature match is found, the method includes writing data to an update file identifying that the data chunks represented by the current second signature are already present in the stored data blocks and storing the update file.

Another embodiment is in the form of a system that includes at least one computer processor, at least one data storage device, and instructions stored on the at least one data storage device that executable by the at least one processor. The instructions are executable by the processor to identify, within at least one data block of a recent backup session, data chunks of the recent backup session present in stored data blocks of previous backup sessions. The identifying performed through execution of the instructions may include calculating current second signatures based on determined boundaries of current first signatures of data chunks of the recent backup session. The identifying may further include performing a search of a second signature repository for the current second signatures to identify second signature matches. The second signature repository in such embodiments stores second signatures calculated based on determined boundaries of first signatures of data chunks of the stored data blocks of the previous backup sessions. When a second signature match is not found through the searching, the instructions are executable to add the current second signature to the second signature repository. When a second signature match is found through the searching, the instructions are executable to write data to an update file identifying that the data chunks represented by the current second signature are already present in the stored data blocks and storing the update file. These and other embodiments are described below with reference to the figures.

DETAILED DESCRIPTION

Figure 1:
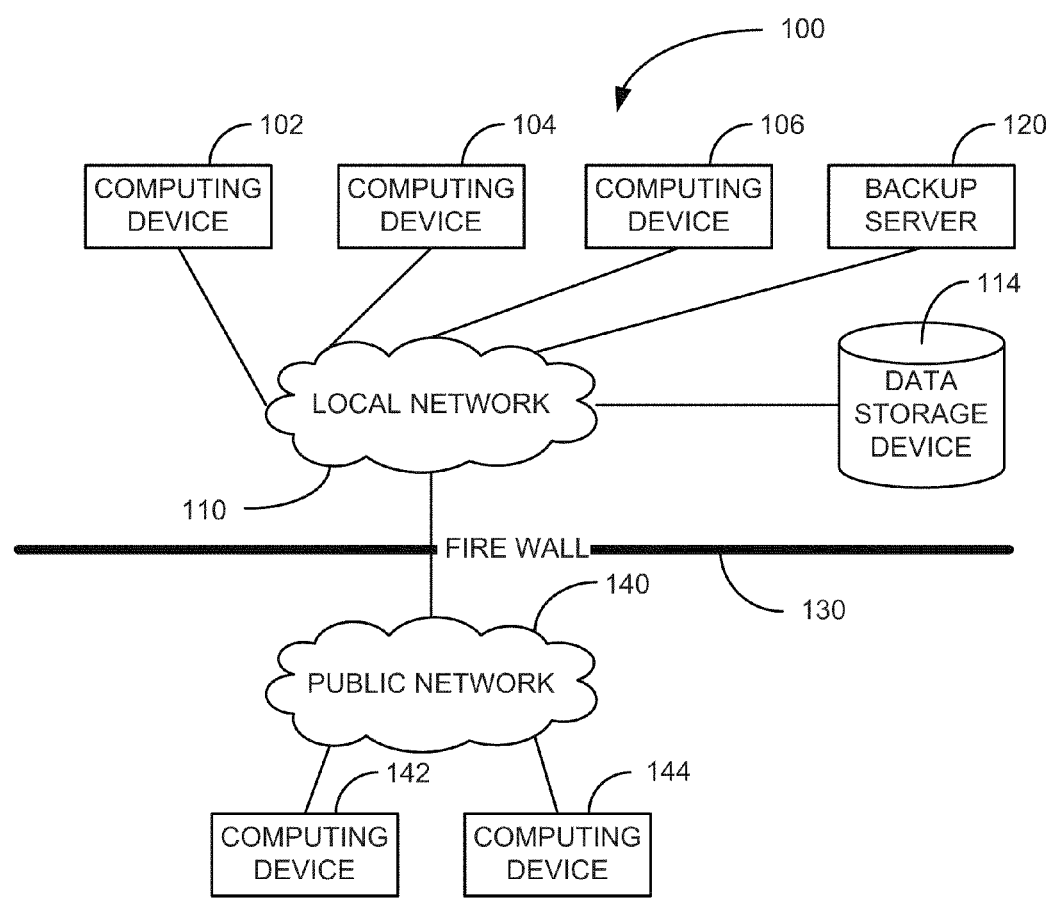
FIG. 1 is a block diagram of a system according to an example embodiment.

Some data backup process that execute to backup data stored on data storage devices of computer compare data in a current backup session with data backed-up in previous backup session which has the same root directory. This comparison is performed to identify data that has not changed since the previous backup session. When the data has not changed since the previous backup session, the data is not backed-up again. However, in computing environments where there are multiple computers and computing devices, it is common that significant amounts of data between the multiple computers and computing devices are duplicated. For example, an organization may have one or few client computer images that are each deployed many times across the client computers of the organization. Similarly, an organization may have multiple server computers that include much of the same software configured in a very similar if not identical manner. In client computer, server computers, and other data processing devices that store data, the data and software that is common between two or more computers is often operating system and application data and software. The various embodiments described herein provide solutions to identify data commonly stored across two or more computers or computing devices and to reduce redundant storage of such data in stored backup data.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them. It is to be understood that other embodiments may be utilized and that structural, logical, and electrical changes may be made without departing from the scope of the inventive subject matter. The following description is, therefore, not to be taken in a limited sense.

The functions or algorithms described herein are implemented in hardware, software, or a combination of software and hardware in one embodiment. The software comprises computer executable instructions stored on computer-readable media such as memory, magnetic disk, or other types of storage devices. Further, described functions, methods, and techniques may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, handheld computing device, set-top box, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a block diagram of a system 100 according to an example embodiment. The system 100 includes computing devices 102, 104, 106 and a backup server 120 connected to a network 110, such as a local area network. Also connected to the network 110 in the illustrated embodiment of the system 100 is a data storage device 114, such as a database under management of a database management system, a file server, or other data storage device capable of storing data and providing access to the stored data to devices connected to the network 110.

In some embodiments, the network 110 of the system 100 may also be connected to a public network 140, such as the Internet. In such embodiments, the network 110 is typically behind a firewall 130 that provides protection from various threats that may be posed through the connection to the public network 140. In some such embodiments, one or more additional computing devices 142, 144 may also be permitted to communicate with the computing devices 102, 104, 106, backup server 120, and data storage device 114, such as through a virtual private network (VPN) connection.

The computing devices 102, 104, 106, 142, 144 may include one or more of many different types of computing devices. For example, the computing devices 102, 104, 106, 142, 144 may include client computing devices such as personal or laptop computers, server computing devices, handheld computing devices such as smart phones, and other computing device types that include a data storage device. Although only three computing devices 102, 104, 106 connected to the network 110 and only two computing devices 142, 144 are illustrated, there may be as few as two total computing devices and up to a virtually a limitless number of computing devices connected to either network 110 and public network 140.

The data storage device 114, in some embodiments, stores backup data of backup sessions of the computing devices 102, 104, 106, 142, 144 and other devices connected to the network that store data that is backed up. The data may be backed-up from the computing devices 102, 104, 106, 142, 144 and other devices by backup process that execute on the respective devices, or elsewhere, to copy data from the respective devices to the data storage device. In the event one of the computing devices 102, 104, 106, 142, 144 or other devices crashes in whole or in part or data is otherwise lost or accidentally deleted, the data may be restored from the backup data stored in the data storage device 114.

The backup server 120 is a server computing device that includes software to identify data that is redundantly stored between backup sessions, and in some embodiments data that is redundantly stored between volumes of backup sessions, on the data storage device.

Figure 2:
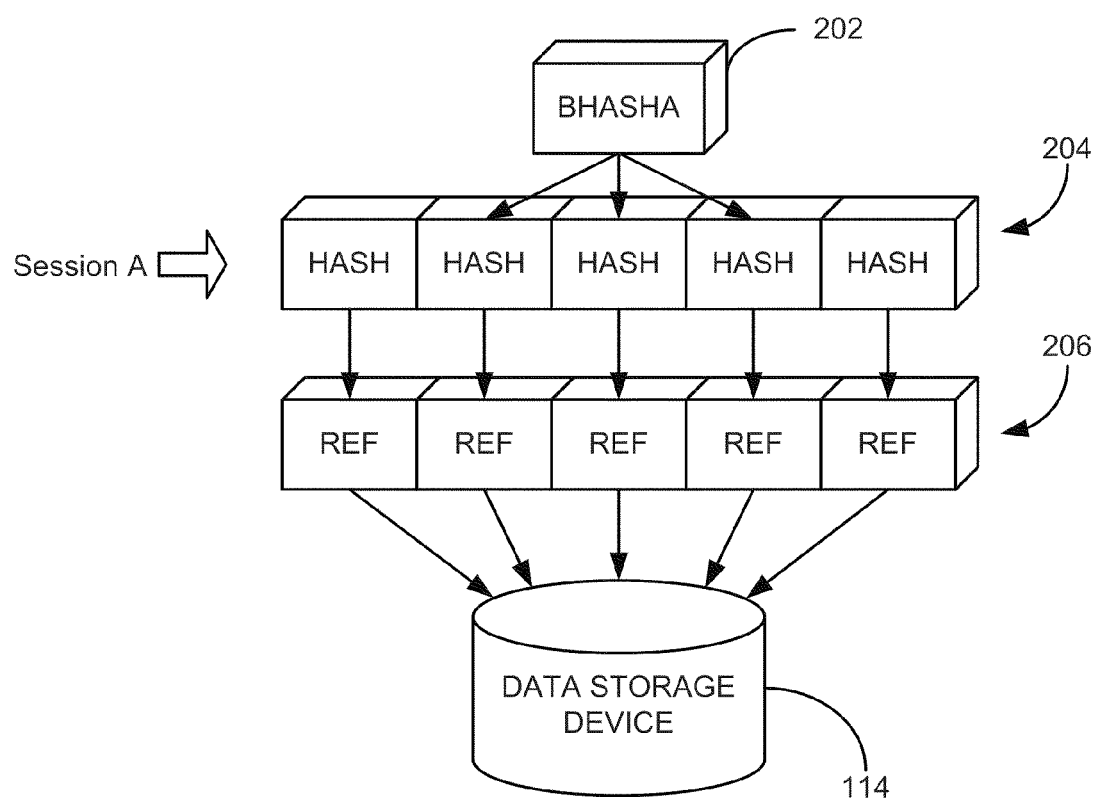
FIG. 2 is a logical illustration of related data elements according to an example embodiment.
Figure 3:
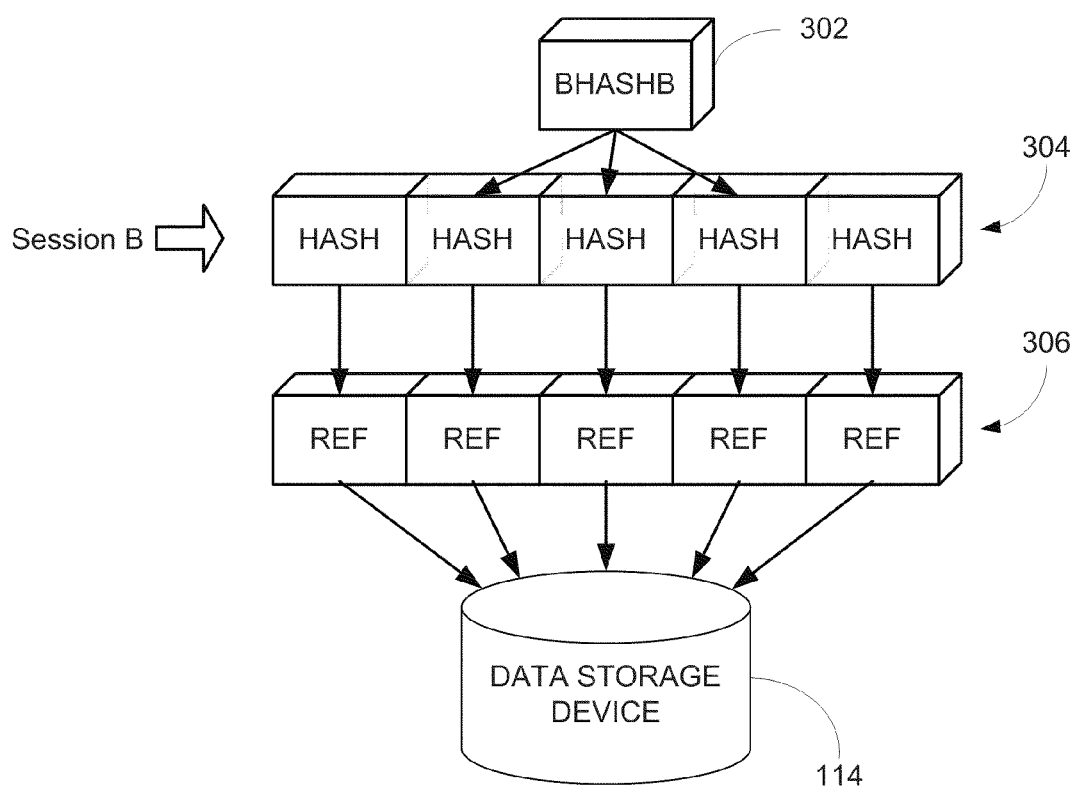
FIG. 3 is a logical illustration of related data elements according to an example embodiment.

FIG. 2 and FIG. 3 are logical illustrations of related data elements according to an example embodiment. Both FIG. 2 and FIG. 3 provide logical illustrations of how metadata descriptive of backup data from backup sessions A and B, respectively, is organized.

First with reference to FIG. 2, as described above, backup data of backup sessions is stored on the data storage device 114. The data of each volume backed-up within a backup session, such as Session A as illustrated in FIG. 2, is referred to herein as a block of data, or data block. (A volume is commonly referred to as a "drive" on a computer, such as "C:\" or "the 'C' drive of a computer"). The data block is then divided into chunks and a signature is generated for each chunk. The signature may be a hash over the chuck, and may include other information such as a length of the chunk in the case of variable size chunks, or further hashes over subsets of the data. The signature, or hash, of each chunk is written to a data structure 204. The data structure 204 typically will include signatures for each of a plurality of chunks of the data block stored in the data storage device, the number of signatures is dependent on the size of the data block and data chunk sizes. In some embodiments, each signature also includes a reference identifier that refers to a data element of another data structure 206 that links the signature to a portion of the data block corresponding to the data chunk for which the signature was calculated.

Thus, a signature held in the data structure 204 includes at least a hash value calculated from a data chunk and a reference to a portion of the data block for which the signature was calculated. In some embodiments, the reference to the portion of the data block is a reference to another data structure 206 that provides linking data between the signature and the respective data chunk within the data block, such as a storage address within the data storage device and a length of the data chunk. The data structure 204 holding the signatures and the data structure 206 providing the links between the signatures and the chunks of data in the data block may be stored on the data storage device 114, on the backup server 120 of FIG. 1, or other data storage location.

In some embodiments, the data in the data structures 206 and 204 is generated and stored by backup process caused the backup data to be stored on the data stored device 114. Thus, creation of the signatures and references and the corresponding data structures 206, 204 is not required in every embodiment.

Once the signatures of the data blocks of a backup session are present, the signatures may then be processed to determine second signatures. A second signature is essentially a signature of signatures. To calculate the second signatures, the signatures of a backup session are divided into chunks of signatures and a signature is determined for each signature chunk. The second signatures may be a hash over the signature chunk, and include other information such as a reference to the signatures within the data structure 204 from which the respective second signature was calculated. The second signatures are then written to a data structure 202. The data structure 202, like the data structures 204 and 206 described above, may be stored on the data storage device 114, on the backup server 120, or other data storage location.

Thus, the data structures 206, 204, and 202 provide signatures at multiple levels that are later used to compare data between backup sessions, and volumes therein, to identify and reduce data that redundantly between backup sessions on the data storage device 114.

In some embodiments, the data block of a session is processed to generate the data held in the data structures 206, 204, and 202 by first calculating natural or logical boundaries of the data block, such as by feeding the data block to an Adler algorithm or other algorithm capable of identifying natural or logical boundaries within a data block. The data between each boundary is referred to as a chunk of data, or data chunk. In some embodiments, the algorithm that identifies the boundaries of a data block finds the boundaries for the data block and divides the data block into a plurality of MD5 data chunks based on the boundaries. An MD5 data chunk represents one data chunk separated by the particular algorithm and is sized between 8 KB and 16 KB in one embodiment, between 8 KB and 32 KB in another embodiment, and other sizes in other embodiments.

A hash key is then calculated for each MD5 data chunk, such as a hash key of 24 bytes. The hash key is the signature for the respective data chunk. The signature is written to the data structure 204 along with either a reference to a data element in the reference data structure 206 that links the signature to the respective data chunk stored in the data storage device or an address specifically to the data chunk stored in the data storage device.

Next, the second signatures are generated by feeding the data structure 204 to an Adler algorithm or other algorithm capable of identifying natural or logical boundaries within the data structure 204. The data structure is divided into a plurality of MD5 data chunks based on the boundaries and a hash is generated for each chunk. The hash is the second signature and the second signatures are written to the data structure 202. Although only a single signature is illustrated in the data structure 202, multiple signatures may be written to and held in the data structure 202.

Referring now to FIG. 3, the data structures 306, 304, 302 are determined in an identical manner as the data structures 206, 204, and 202 as described above with regard to FIG. 2. However, the data block from which the data structures 306, 304, 302 were determined is from a different backup session, Session B, of a different computing device.

Figure 4:
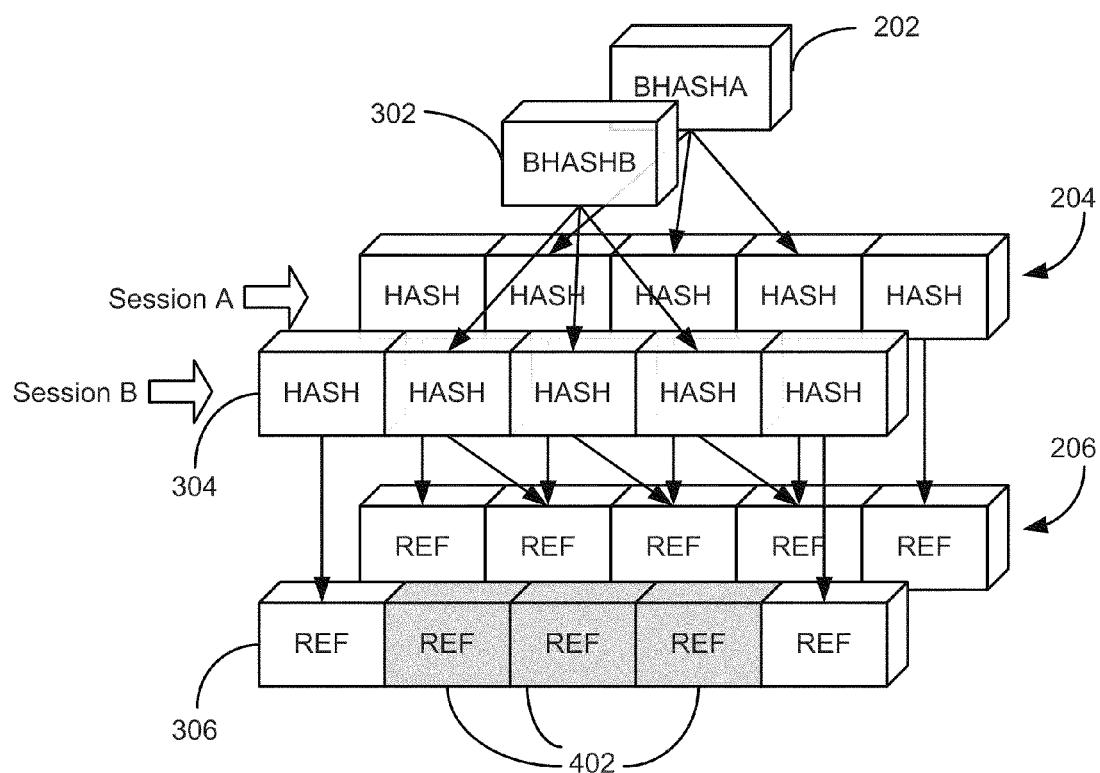
FIG. 4 is a logical illustration of related data elements according to an example embodiment.

FIG. 4 is a logical illustration of related data elements according to an example embodiment. The illustration of FIG. 4 includes the data structures 206, 204, and 202 generated based on the data block of Session A as illustrated and described with regard to FIG. 2. The illustration of FIG. 4 also includes the data structures 306, 304, and 302 generated based on the data block of Session B as illustrated and described with regard to FIG. 3. FIG. 4 provides an illustration of when second signatures of data structures 202 and 302 of backup sessions A and B are matched and how the data structure 304 is modified to reduce the amount of redundantly stored backup data. For example, because the second signatures of backup sessions A and B match, the underlying data chunks represented by those second signatures are identical. Thus, the goal is to modify at least one data structure of one of the sessions, A or B, so only one set of data chunks represented by both second signatures is referenced. Because of such modification, one set of the identical data chunks will be referenced by the data of both session and the other set of identical data will not be referenced by either session. This is illustrated in FIG. 4 where the links from hash signatures in the data structure 304 of Session B are modified to be linked to references in the data structure 206 of Session A. As a result, the references 402 of the data structure 306 and the data chunks the references 402 point to can be deleted. These deletions, in some embodiments may occur as part of a process that identifies the matches between second signatures and modifies the links from the signatures. In other embodiments, a cleanup or "garbage collection" process may execute to identify and delete data chunks that are no longer linked to a signature.

Figure 5:
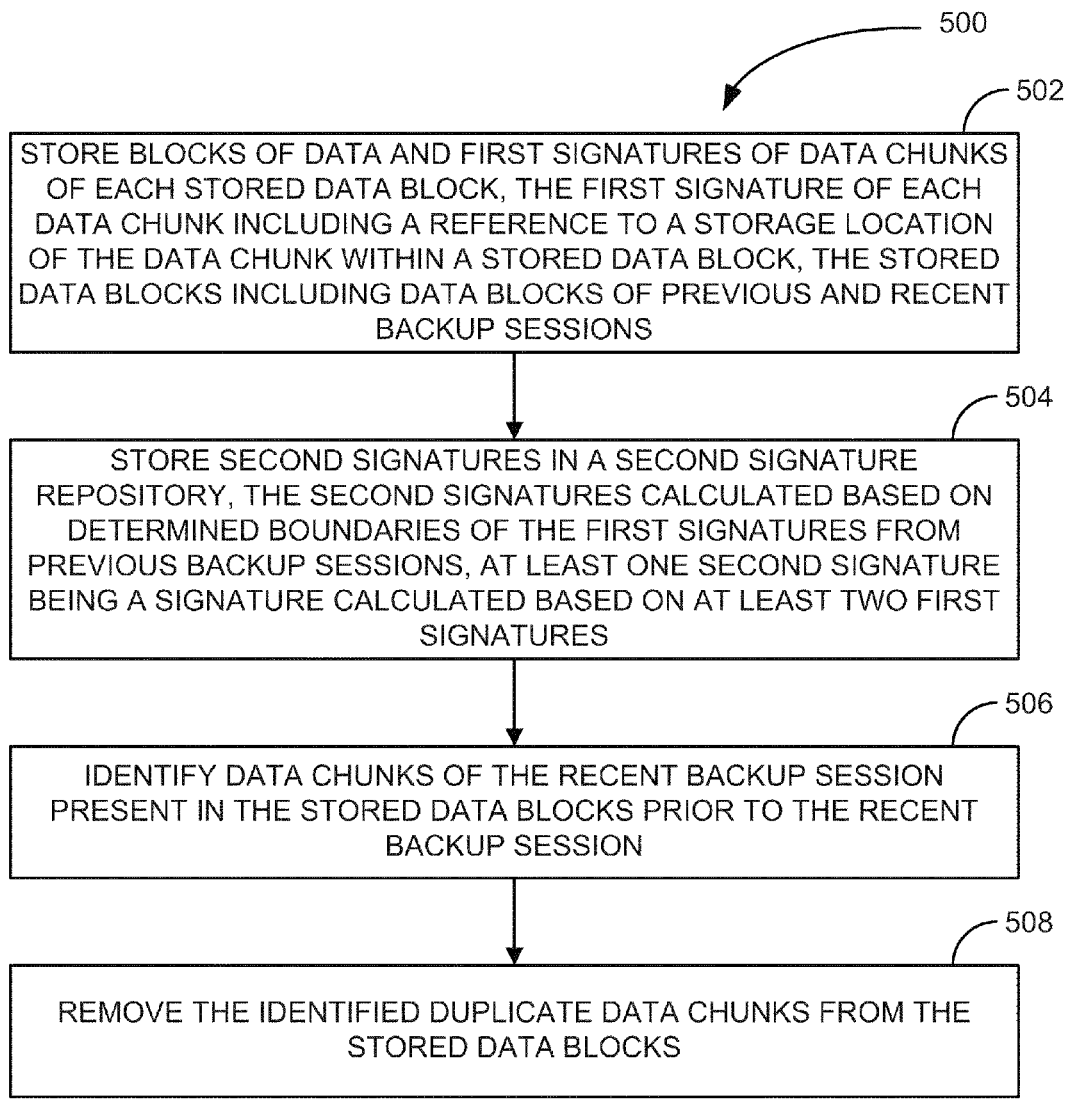
FIG. 5 is a block flow diagram of a method according to an example embodiment.

FIG. 5 is a block flow diagram of a method 500 according to an example embodiment. The method 500 is an example method for identification, consolidation, and reduction of redundantly stored backup data from multiple different backup sessions of different computing devices. The method 500 includes storing 502 blocks of data and first signatures of data chunks of each stored data block. In such embodiments, the first signature of each data chunk includes a reference to a storage location of the data chunk within a stored data block. Further, the stored data blocks include data blocks of previous and recent backup sessions. The data blocks of previous backup sessions have been processed according to the method 500 while the data blocks of the recent backup sessions have not.

The method 500 further includes storing 504 second signatures in a second signature repository. Such second signatures are calculated based on determined boundaries of the first signatures from previous backup sessions. The second signatures are typically calculated based on at least two first signatures and often more than two, such as between 32 and 64 signatures. The method 500 then proceeds by identifying 506 data chunks of the recent backup session present in the stored data blocks prior to the recent backup session. The identifying 506 of the data chunks may be performed on a scheduled periodic basis, such as every two hours or once a day at a particular time. However, the identifying 506 may instead be an administrator triggered process while in other embodiments, the identifying may execute upon an occurrence of an event, such as receipt of a new backup session. The method 500 may then modify the signatures of the recent backup session corresponding to data chunks already present to point to the previously stored data chunks and then remove 508 the identified duplicate data chucks from the stored data blocks.

In some embodiments, the storing 502 of data blocks and first signatures of data chunks of each stored data block where the signature of each data chunk includes a reference to a storage location of the data chunk includes storing the data blocks on at least one data storage device. The storing 502 may further include storing the first signatures and references to storage locations of the data chunks in at least one data structure. This at least one data structure may include a session portion that stores session identifiers of backup sessions and a first signature portion that stores first signatures and an association of each first signature with a backup session and a reference identifier. In some embodiments, the at least one data structure further includes a reference portion that stores a reference identifier, a reference to a chunk of data in a data block stored on the at least one data storage device, and a counter of a number of first signature portions that reference the reference identifier.

In such embodiments of the method 500, when a duplicate second signature is identified, the reference identifiers of the first signature portions of current first signatures that the matched second signature was determined from are changed to include the reference identifiers of the first signature portions of the first signatures from which the second signature of the previous backup session were determined from. The counters of the reference portions that are no longer referenced by a first signature portion are then decremented and the counters of the reference portions that are added to the first signature portions and incremented. As a result, the counters of the reference portions that are no longer referenced by a first signature portion are equal to zero. Another process may then execute to identify reference portions with a counter equal to zero which will then delete the corresponding chunks of data stored in the at least one data storage device that are referenced by the identified reference portions.

Figure 6:
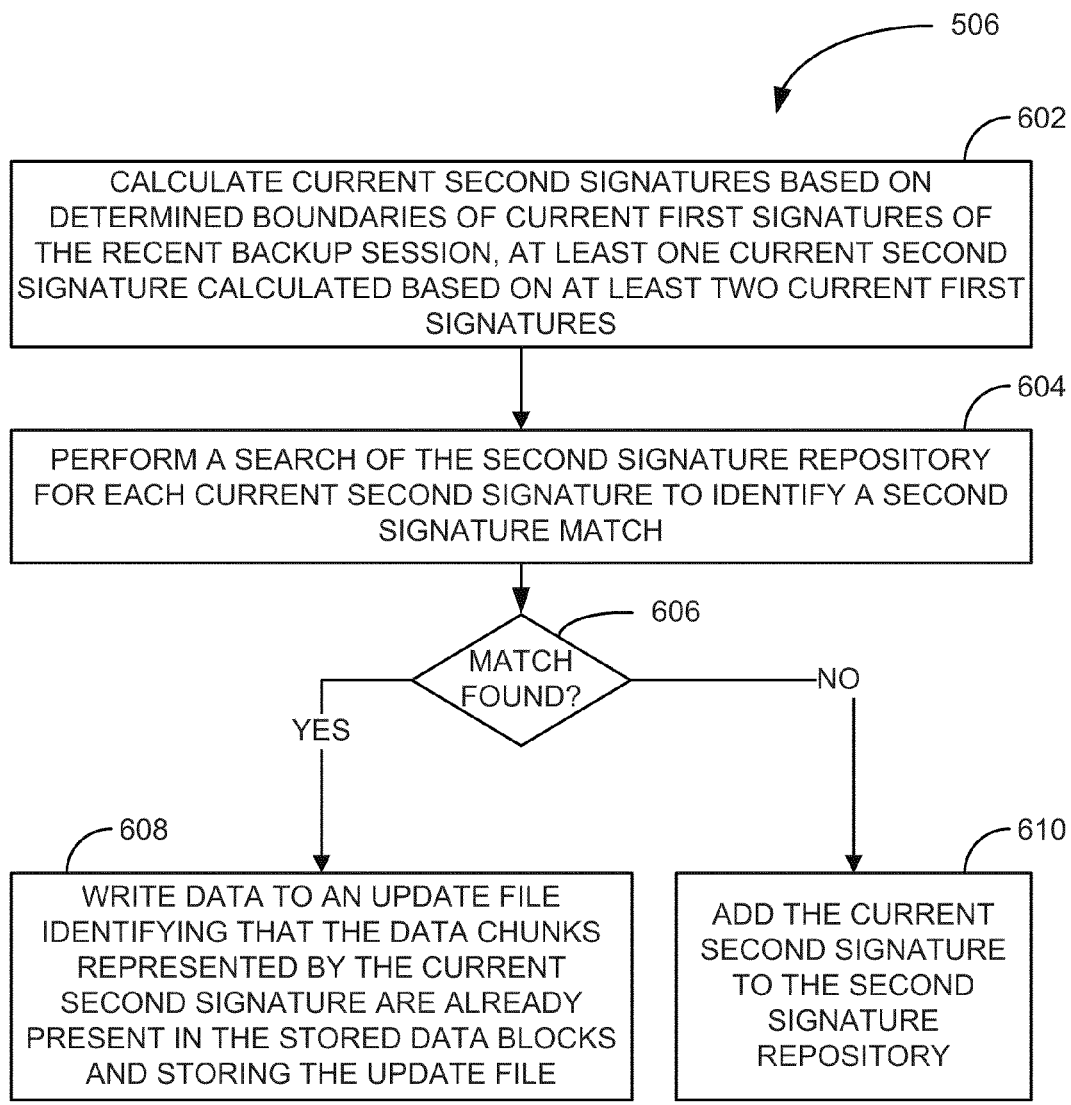
FIG. 6 is a block flow diagram of a method according to an example embodiment.

FIG. 6 is a block flow diagram of a method according to an example embodiment. The method of FIG. 6 provides further details, according to some embodiments, of the identifying 506 data chunks of the data chunks of the recent backup session present in the stored data blocks prior to the recent backup session of the method 500 of FIG. 5. For example, the identifying 506 may include calculating 602 current second signatures based on determined boundaries of current first signatures of the recent backup session. The boundaries may be determined according to an Adler algorithm. In some embodiments, at least one current second signature is calculated based on at least two current first signatures. In some embodiments, the at least two current first signatures is a number of signatures in range of 32 to 64 signatures. The identifying 506 may further include performing 604 a search of the second signature repository for the current second signatures to identify second signature matches. The second signature repository, in some embodiments, is a data structure loaded into a memory of a computer performing the method 500 based on the data of the data structures 202 and 302 of FIG. 2, FIG. 3, and FIG. In other embodiments, the second signature repository may be a database table indexed based on a second signature column, a file including second signatures of multiple backup sessions, or other data structure stored in a data storage device or held in a memory of a computing device.

A determination 606 is then made with regard to each current second signature of whether a match has been found by the performed 604 search. When a second signature match is not found, the current second signature is added 610 to the second signature repository. When a second signature match is found, data is written 608 to an update file identifying that the data chunks represented by the current second signature are already present in the stored data blocks and storing the update file.

In some embodiments of the method 500 and the identifying 506 as further described with regard to FIG. 6, writing 608 data to the update file identifying that the data chunks represented by the current second signature are already present in the stored data blocks may include writing 608 certain specific data. For example, the writing 608 of the data may include writing 608 the second signature for which a match is found and the first signatures the second signature is calculated from. The writing 608 may further include writing 608 the references to the storage locations of the data chunks represented by the first signatures the current second signature was calculated from and the references to the storage locations of the data chunks represented by the first signatures the second signature in the second signature repository was calculated from. An example embodiment of how the update file including such data is processed is provided in FIG. 7.

Figure 7:
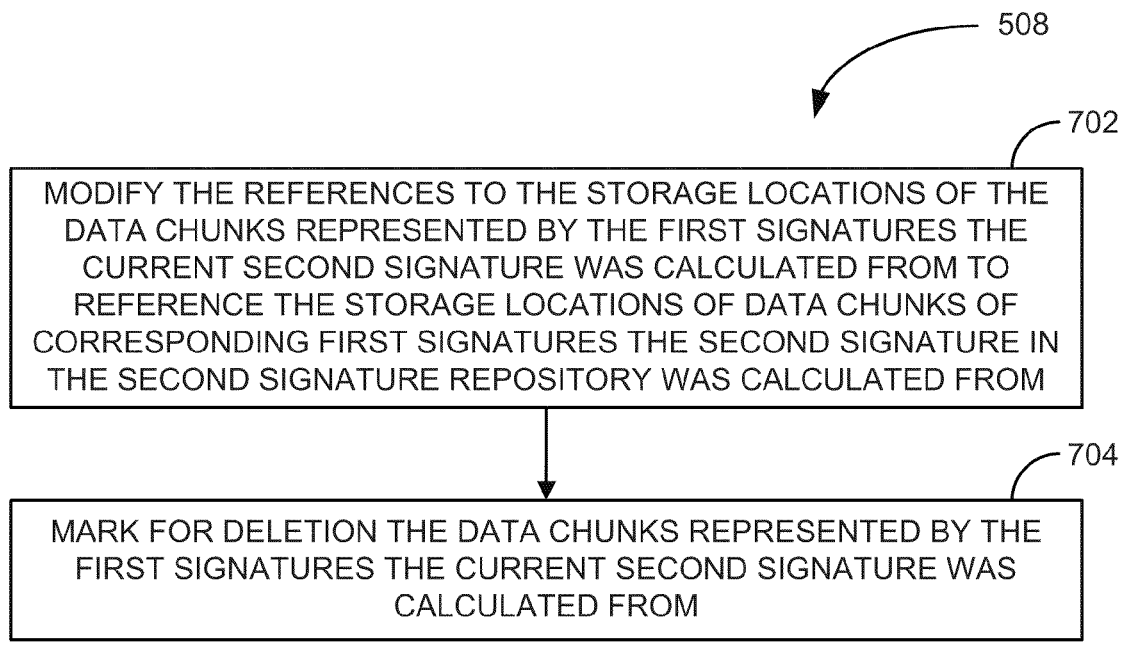
FIG. 7 is a block flow diagram of a method according to an example embodiment.

FIG. 7 is a block flow diagram of a method according to an example embodiment. The method of FIG. 7 provides additional details, according to one embodiment, of removing 508 the identified duplicate data chunks from the stored data blocks as described above with regard to the method 500 of FIG. 5. For example, the removing 508 of the identified duplicate data chunks from the stored data blocks includes modifying 702 the references to the storage locations of the data chunks represented by the first signatures the current second signature was calculated from. The references to the storage location of the data chunks are modified 702 to reference the storage locations of data chunks of corresponding first signatures the second signature in the second signature repository was calculated from. The removing 508 further includes marking 704 for deletion the data chunks represented by the first signatures the current second signature was calculated from. The marking 704 may include decrementing a reference counter of a reference data item previously associated with a first signature. The removing 508 may further operate to delete the data chunks marked for deletion.

Figure 8:
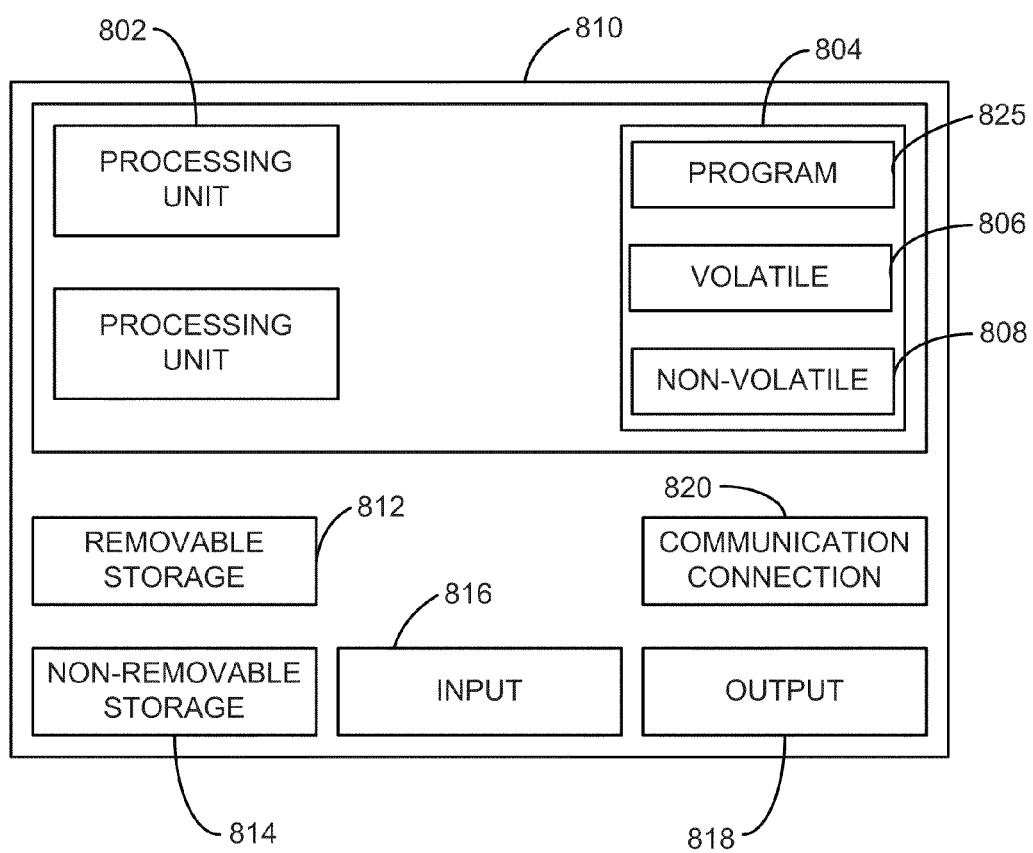
FIG. 8 is a block diagram of a computing device according to an example embodiment.

FIG. 8 is a block diagram of a computing device according to an example embodiment. In one embodiment, multiple such computer systems are utilized in a distributed network to implement multiple components in a transaction-based environment. An object oriented, service oriented, or other architecture may be used to implement such functions and communicate between the multiple systems and components. One example computing device in the form of a computer 810, may include at least one of each of a processing unit 802, memory 804, removable storage 812, and non-removable storage 814. Memory 804 may include volatile memory 806 and non-volatile memory 808. Computer 810 may include— or have access to a computing environment that includes—a variety of computer-readable media, such as volatile memory 806 and non-volatile memory 808, removable storage 812 and non-removable storage 814. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 810 may include or have access to a computing environment that includes input 816, output 818, and a communication connection 820 such as a network interface device. The computer may operate in a networked environment using a communication connection to connect to one or more remote computers, such as database servers, file servers, and other such servers and devices. The remote computer may include a personal computer (PC), server, router, network PC, a peer device or other common network node, or the like. The communication connection may include one or both of a wired and wireless connection to a Local Area Network (LAN), a Wide Area Network (WAN), the Internet, a virtual private network connection over such networks, or other networks and secure or non-secure connections.

Computer-readable instructions stored on a computer-readable medium are executable by the at least one processing unit 802 of the computer 810. A hard drive, CD-ROM, and RAM are some examples of articles including a computer-readable medium. For example, a computer program 825 capable of performing one or more of the methods, processes, or techniques described above. For example, the computer program 825 may be executable by the at least one processing unit 802 to identify, within at least one data block of a recent backup session, data chunks included in the recent backup session and present in stored data blocks of previous backup sessions. The identifying of such data blocks by the computer program 825 may include calculating current second signatures based on determined boundaries of current first signatures of data chunks of the recent backup session, at least one current second signature calculated based on at least two current first signatures. The computer program 825 further executes in such embodiments to perform a search of a second signature repository for the current second signatures to identify second signature matches. The second signature repository typically stores second signatures calculated based on determined boundaries of first signatures of data chunks of the stored data blocks of the previous backup sessions. Then, when the computer program 825 finds a match, data is written to an update file identifying that the data chunks represented by the current second signature are already present in the stored data blocks and storing the update file. However, when a second signature match is not found, the computer program 825 adds the current second signature to the second signature repository. The computer program 825 in such embodiments may execute on a recurring periodic basis or as otherwise scheduled. For example, the computer program may execute daily or every so many hours, such as every six hours.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
    storing, on at least one data storage device, blocks of data and first signatures of data chunks of each stored data block, the first signature of each data chunk including a reference to a storage location of the data chunk within a stored data block, the stored data blocks including data blocks of previous and recent backup sessions;
    storing, on the at least one data storage device, second signatures in a second signature repository, the second signatures calculated based on determined boundaries of the first signatures from previous backup sessions, at least one second signature being a signature calculated based on at least two first signatures of corresponding data chunks; and
    identifying data chunks of the recent backup session present in the stored data blocks prior to the recent backup session, the identifying including execution of instructions on at least one computer processor to perform data processing including:
        calculating, with regard to the recent backup session, second signatures based on determined boundaries of current first signatures of the recent backup session, at least one second signature calculated based on at least two first signatures of corresponding data chunks of the recent backup session;
        performing a search of the second signature repository for the calculated second signatures of the recent backup session to identify second signature matches;
        when a second signature match is not found, adding the unmatched second signature to the second signature repository;
        when a second signature match is found, writing data to an update file on the at least one data storage device, the data written to the update file identifying that the data chunks represented by the matched second signature are already present in the stored data blocks and storing the update file, the update file enabling a further process to remove duplicate data chunks from the blocks of data stored on the at least one data storage device.

2. The method of claim 1, wherein the identifying of data chunks of the recent backup session present in the stored data blocks prior to the recent backup session is performed on a scheduled, periodic basis.

3. The method of claim 1, wherein the data written to the update file identifying that the data chunks represented by the matched second signature are already present in the stored data blocks includes:
    the second signature for which a match is found;
    the first signatures the second signature is calculated from;
    the references to the storage locations of the data chunks represented by the first signatures the matched second signature was calculated from; and
    the references to the storage locations of the data chunks represented by the first signatures the second signature in the second signature repository was calculated from.

4. The method of claim 3, further comprising processing the update file to remove duplicate data chunks from the stored data blocks based on data in the update file, the processing of the update file including:
    modifying the references to the storage locations of the data chunks represented by the first signatures the matched second signature was calculated from to reference the storage locations of data chunks of corresponding first signatures the second signature in the second signature repository was calculated from; and
    marking for deletion the data chunks represented by the first signatures the matched second signature was calculated from.

5. The method of claim 4, further comprising:
    deleting the data chunks marked for deletion.

6. The method of claim 1, wherein storing data blocks and first signatures of each stored data block, the signature of each data chunk including a reference to a storage location of the data chunk includes storing:
    the data blocks on at least one data storage device; and
    the first signatures and references to storage locations of the data chunks in at least one data structure, the at least one data structure including:
        a session portion that stores session identifiers of backup sessions;
        a first signature portion that stores first signatures and an association of each first signature with a backup session and a reference identifier; and
        a reference portion that stores a reference identifier, a reference to a chunk of data in a data block stored on the at least one data storage device, and a counter of a number of first signature portions that reference the reference identifier.

7. The method of claim 1, wherein a data block corresponds to a volume on a machine.

8. A non-transitory computer-readable storage medium, with instructions stored thereon which when executed by a processor of a computer, result in the computer:

storing, on at least one data storage device, blocks of data and first signatures of data chunks of each stored data block, the first signature of each data chunk including a reference to a storage location of the data chunk within a stored data block, the stored data blocks including data blocks of previous and recent backup sessions;

storing, on the at least one data storage device, second signatures in a second signature repository, the second signatures calculated based on determined boundaries of the first signatures from previous backup sessions, at least one second signature being a signature calculated based on at least two first signatures of corresponding data chunks; and identifying data chunks of the recent backup session present in the stored data blocks prior to the recent backup session, the identifying including:

calculating, with regard to the recent backup session, second signatures based on determined boundaries of first signatures of the recent backup session, at least one second signature calculated based on at least 32 first signatures of corresponding data chunks of the recent backup session;

performing a search of the second signature repository for the calculated second signatures of the recent backup session to identify second signature matches;

when a second signature match is not found, adding the unmatched second signature to the second signature repository;

when a second signature match is found, writing data to an update file on the at least one data storage device, the data written to the update file identifying that the data chunks represented by the matched second signature are already present in the stored data blocks and storing the update file, the update file enabling a further process to remove duplicate data chunks from the blocks of data stored on the at least one data storage device.

9. The non-transitory computer-readable storage medium of claim 8, wherein the identifying of data chunks of the recent backup session present in the stored data blocks prior to the recent backup session is performed on a scheduled, periodic basis.

10. The non-transitory computer-readable storage medium of claim 8, wherein the data written to the update file identifying that the data chunks represented by the matched second signature are already present in the stored data blocks includes:

the second signature for which a match is found;
the first signatures the second signature is calculated from;
the references to the storage locations of the data chunks represented by the first signatures the matched second signature was calculated from; and
the references to the storage locations of the data chunks represented by the first signatures the second signature in the second signature repository was calculated from.

11. The non-transitory computer-readable storage medium of claim 10, with further instructions stored thereon which when executed by the processor of the computer, result in the computer:

processing the update file to remove duplicate data chunks from the stored data blocks based on data in the update file, the processing of the update file including:

modifying the references to the storage locations of the data chunks represented by the first signatures the matched second signature was calculated from to reference the storage locations of data chunks of corresponding first signatures the second signature in the second signature repository was calculated from; and
marking for deletion the data chunks represented by the first signatures the matched second signature was calculated from.

12. The non-transitory computer-readable storage medium of claim 11, with further instructions stored thereon which when executed by the processor of the computer, result in the computer:

deleting the data chunks marked for deletion.

13. The non-transitory computer-readable storage medium of claim 8, wherein storing data blocks and first signatures of each stored data block, the signature of each data chunk including a reference to a storage location of the data chunk includes storing:

the data blocks on at least one data storage device; and
the first signatures and references to storage locations of the data chunks in at least one data structure, the at least one data structure including:

a session portion that stores session identifiers of backup sessions;
a first signature portion that stores first signatures and an association of each first signature with a backup session and a reference identifier; and
a reference portion that stores a reference identifier, a reference to a chunk of data in a data block stored on the at least one data storage device, and a counter of a number of first signature portions that reference the reference identifier.

14. The non-transitory computer-readable storage medium of claim 8, wherein a data block corresponds to a volume on a machine.

15. A system comprising:
at least one computer processor;
at least one data storage device;
instructions stored on the at least one data storage device and executable by the at least one processor to:

identify, within at least one data block of a recent backup session, data chunks of the recent backup session present in stored data blocks of previous backup sessions, the data chunks stored on the at least one data storage device, the identifying including:

calculating, with regard to the recent backup session, second signatures based on determined boundaries of first signatures of data chunks of the recent backup session, at least one second signature calculated based on at least two first signatures of corresponding data chunks of the recent backup session;

performing a search of a second signature repository for the calculated second signatures of the recent backup session to identify second signature matches, the second signature repository storing second signatures calculated based on determined boundaries of first signatures of data chunks of the stored data blocks of the previous backup sessions;

when a second signature match is not found, adding the unmatched second signature to the second signature repository;

when a second signature match is found, writing data to an update file on the at least one data storage device, the data written to the update file identifying that the data chunks represented by the matched second signature are already present in the stored data blocks and storing the update file, the update file enabling a further process to remove duplicate data chunks from the blocks of data stored on the at least one data storage device.

16. The system of claim 15, wherein the identifying data chunks of the recent backup session present in stored data blocks of previous backup session is performed every six hours.

17. The system of claim 15, wherein the data written to the update file identifying that the data chunks represented by the matched second signature are already present in the stored data blocks of previous backup sessions includes:
- the second signature for which a match is found;
- the first signatures the second signature is calculated from;
- references to storage locations of the data chunks represented by the first signatures the matched second signature was calculated from; and
- references to storage locations of the data chunks represented by the first signatures the second signature in the second signature repository was calculated from.

18. The system of claim 17, wherein the instructions are further executable by the at least one processor to:
- process the update file to remove duplicate data chunks from the stored data blocks based on data in the update file, the processing of the update file including:
  - modifying references to the storage locations of the data chunks represented by the first signatures the matched second signature was calculated from to reference the storage locations of data chunks of corresponding first signatures the second signature in the second signature repository was calculated from;
  - marking for deletion the data chunks represented by the first signatures the matched second signature was calculated from.

19. The system of claim 18, wherein the instructions are further executable by the at least one processor to:
- delete the data chunks marked for deletion.

20. The system of claim 15, the system further comprising:
- a network interface device; and
- wherein a data block corresponds to a volume defined within a data storage device of a computing device accessible by the system over a network via the network interface device.

* * * * *